No. 792,831. Patented June 20, 1905.

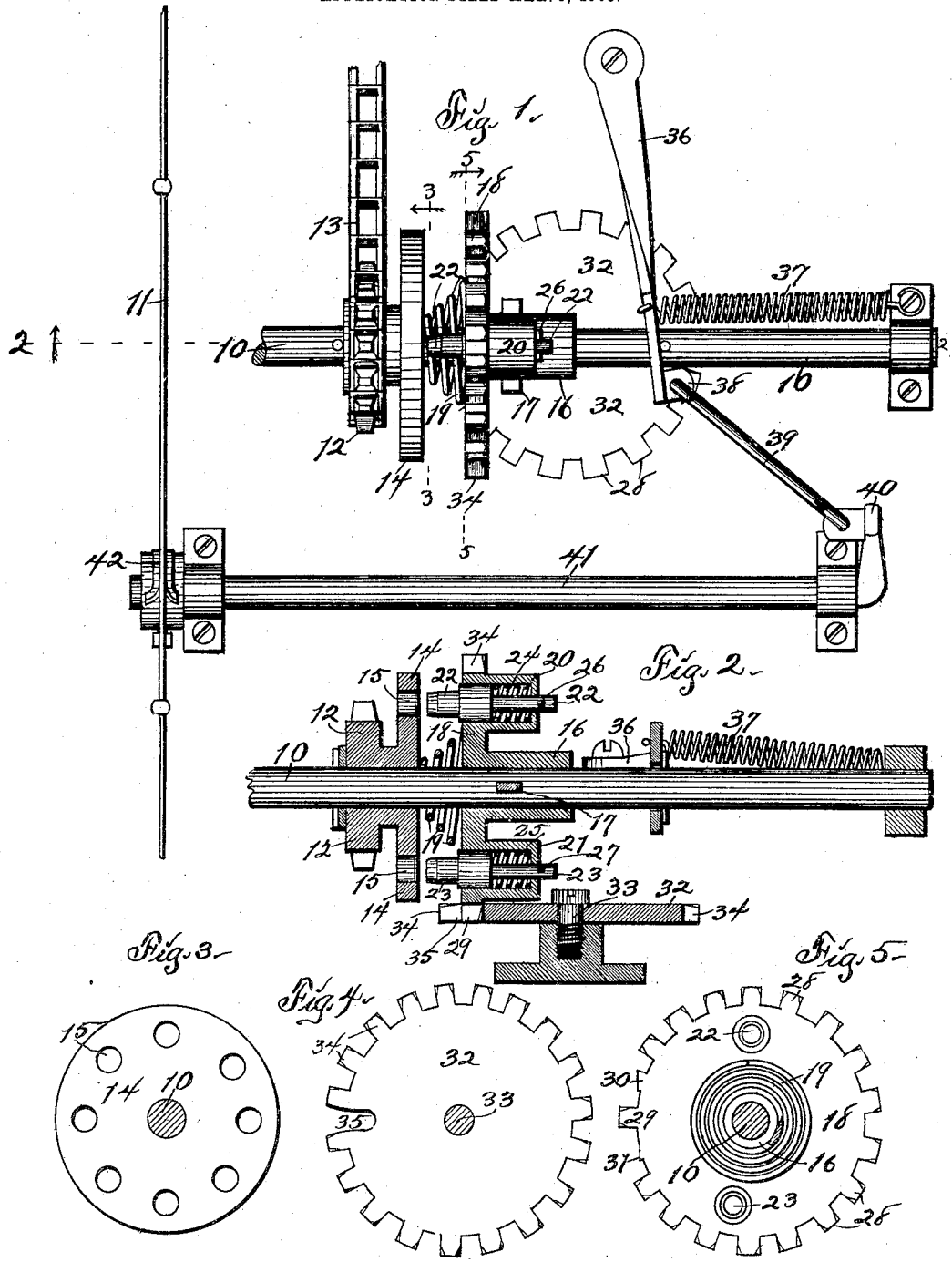

UNITED STATES PATENT OFFICE.

ROBERT S. KIRKPATRICK, OF DES MOINES, IOWA.

CLUTCH MECHANISM FOR CORN-PLANTERS.

SPECIFICATION forming part of Letters Patent No. 792,831, dated June 20, 1905.

Application filed March 3, 1903. Serial No. 146,026.

*To all whom it may concern:*

Be it known that I, ROBERT S. KIRKPATRICK, a citizen of the United States of America, and a resident of Des Moines, Polk county, Iowa, have invented a new and useful Clutch Mechanism for Corn-Planters, of which the following is a specification.

The object of this invention is to provide improved means for intermittently rotating a shaft by periodical connection of said shaft with a continuously-rotated member.

My invention consists in the construction, arrangement, and combination of elements hereinafter set forth, pointed out in my claims, and illustrated by the accompanying drawings, in which—

Figure 1 is a top view or plan illustrating my improved device mounted as required for practical use in conjunction with the seed-plate-operating shaft of a corn-planter and a knotted check-wire commonly employed with corn-planting machines. Fig. 2 is a vertical section of the device on the indicated line 2 2 of Fig. 1. Fig. 3 is a cross-section of the device on the indicated line 3 3 of Fig. 1. Fig. 4 is a plan of a portion of the device, and Fig. 5 is a cross-section of the device on the indicated line 5 5 of Fig. 1.

In the construction of the machine as shown the numeral 10 designates a shaft which is identical with the shaft preferably employed to operate the seed-plates in the boxes of a corn-planter of common form. This shaft may be of any desired construction, the seed-boxes and seed-plates may be of any desired form and construction, and the connections between the shaft and seed-plates may be of any desired character, since such parts and the forms thereof are now common and well known and form no part of my present invention.

It is recognized as being desirable to operate the seed-plates or the dropping-valves of a corn-planter at predetermined intervals and with regularity in the travel of a planting-machine across a field, and for such purpose it is common to employ a knotted wire 11, the knots or tappets of which are spaced apart distances corresponding with the desired spacing apart of the hills of corn being planted. The connections between the check-wire and seed-plates or dropping-valves vary as to form and operation, and it is to the provision of such connections of novel form and peculiar operation that this invention relates.

A sprocket-wheel 12 is mounted loosely for revolution on the shaft 10 and is connected by sprocket-chain 13 to a sprocket-wheel (not shown) on the axle of the corn-planter, it being understood that the axle is rotated continuously in the travel of the planter across the field. A clutch member 14 is formed on or fixed to the sprocket-wheel 12 and revolves with said wheel on the shaft 10. The clutch member 14 preferably is formed of a disk with a plurality of holes or pin-seats 15 transversely thereof and arranged in a row concentric with the axis of the disk.

A hub 16 is mounted on the shaft 10 and is keyed thereto for movement longitudinally thereof and rotation therewith by means of a key 17, extending through the shaft and traversing slots in the hub. A disk 18 is mounted on or formed integral with the hub 16, and an expansive coil-spring 19 is mounted on the shaft 10 and impinges at its opposite ends on the disk 18 and clutch member 14, thus tending to separate the disk from the clutch member. Apertures are formed in the disk 18 on opposite sides of the shaft 10, and spring-boxes 20 21 are formed on the disk surrounding said apertures and extending from the disk. Pins 22 23 are mounted for rectilinear reciprocation in the apertures and spring-boxes and are formed with shoulders at their central portions, and expansive coil-springs 24 25 are mounted around the pins within said boxes and impinge at their opposite ends against the shoulders and the inner surfaces of the ends of the boxes, thus tending to move the pins toward the clutch member 14. Stop pins or keys 26 27 are mounted in and transversely of the end portions of the pins 22 23 outside the boxes and serve to limit movement of the pins in one direction under the influence of the springs. End portions of the pins 22 23 project from the disk 18 sufficiently to enter and engage in the holes or pin-seats 15 of the clutch member 14 when the disk 18 is approximated to the clutch member, as hereinafter described. The disk 18 is provided with a plurality of teeth on its periphery, part of which teeth are designated in the drawings by the numeral 28 and part by the numerals 29, 30, and 31. The teeth 28 and 29 are of uniform pitch, and all the teeth are spaced apart uniform distances; but the teeth 30 and 31 are cut away or shortened on either side of the tooth 29.

A locking-wheel 32 is mounted for revolution on a pin, screw, or bolt 33, and the axis of revolution of the locking-wheel is at right angles to the axis of the shaft 10. The locking-wheel 32 is provided with a plurality of teeth 34 on its periphery, which teeth are of uniform size and pitch except that a notch 35 is formed between two of the teeth to a greater depth than ordinary. The teeth of the disk 18 mesh at all times with the teeth of the locking-wheel 32, except that when the disk is at rest and stationary the tooth 29 thereon enters or is forced by the spring 19 into the notch 35, and the fore-shortened teeth 30 and 31 of the disk bear on the upper surface of the locking-wheel. Thus it is seen that when the tooth 29 is seated in the notch 35 and the teeth 30 and 31 engage the upper surface of the locking-wheel 32 said locking-wheel serves as a stop to limit and prevent rotation of the disk 18 in either direction. Therefore the locking-wheel 32 provides an effective means for preventing rotation of the shaft 10 and the operation of the seed-plates or dropping-valves by said shaft, and at the same time the clutch member 14 is permitted to revolve on the shaft under the impulse of the axle of the planter.

An arm 36 is pivoted at one end for oscillation, and the other end of said arm is slotted or apertured for reception of the shaft 10 and arranged for oscillation thereon and rectilinearly thereof. A retractile coil-spring 37 is attached at one end to a suitable support, such as a bearing for the shaft 10, and is attached at its other end to that end portion of the arm 36 adjacent the shaft. It is the function of the spring 37 to withhold the arm 36 from the hub 16 or withdraw it from said hub when operated toward the disk 18, as hereinafter described. An eye 38 is formed in the end portion of the arm 36 adjacent the shaft 10 and is pivotally connected to one end portion of a pitman 39. The opposite end portion of the pitman 39 is pivotally connected to the extremity of a crank-arm 40 on one end portion of a rock-shaft 41, which rock-shaft is mounted for oscillation on an axis parallel with the axis of the shaft 10. A check-fork 42 is fixed to and rises from the end portion of the rock-shaft 41 opposite to the crank-arm 40 and is arranged to receive the check-wire 11 and be moved rearwardly by the tappets or knots of said wire in the forward travel of the planter across a field. In the rearward movement of the check-fork under the resistance of a tappet or knot of the check-wire the rock-shaft 41 is oscillated or rocked rearwardly, thus moving the extremity of the crank-arm 40 rearwardly. I arrange the forward extremity of the arm 36 and the crank-arm 40 at different points in the length of the rock-shaft in order that the pitman 39 may extend obliquely from the crank-arm (toward the disk 18) to the arm 36. Thus when the crank-arm 40 is moved rearwardly it exerts a rearward pressure on the pitman, and said pitman pushes the end of the arm 36 to which it is attached along the shaft 10 toward the hub 16 and against the resilience of the spring 37. The stroke of the crank-arm is such that the arm 36 engages and moves the hub toward the clutch member 14 against the resilience of the spring 19 to such an extent that the pins 22 23 enter (one or another of them) in one or another of the pin-seats or holes 15 of the clutch member 14. The spring on the non-entering pin 22 or 23 will yield and permit the closer approximation of the disk 18 to the clutch member 14. In the movement of the disk 18 toward the clutch member 14 and before the engagement of either of the pins 22 23 with said clutch member the tooth 29 on the disk is unseated from the notch 35 and brought into the space between the outer ends of the teeth bordering said notch. At the same time the fore-shortened teeth 30 and 31 are moved outward and away from the body of the locking-wheel. Thus when the pins, or either of them, engage in seats of the clutch member and lock the disk thereto the disk is unlocked from the locking-wheel notch 35 and is permitted to revolve with the clutch member. In the revolution of the disk 18 with the clutch member 14 the shaft 10 is rotated, and the teeth of the disk mesh with the teeth of the locking-wheel and revolve said wheel. Before the completion of one revolution of the disk 18 and locking-wheel the check-fork 42 passes beneath and out of engagement with the tappet or knot of the wire 11 and is reëstablished in its initial position in readiness to receive the impact of the successive tappet by means such as a spring 37. Hence the rock-shaft and crank-arm thereon are repositioned as shown, and the arm 36 is withdrawn from engagement with the hub 16. Thus provision is made that when the revolution of the disk and locking-wheel is complete the spring 19 may expand and separate the disk from the clutch member and force the tooth 29 into the notch 35 and the teeth 30 and 31 into engagement with the body of the locking-wheel. Thus the disk and shaft are again locked against rotation after a complete revolution of the shaft and consequent operation of the seed-plates or dropping-valves. The operation of engaging and disengaging the disk 18 and clutch member 14 is repeated coincident with each engagement of a tappet or knot on the wire 11 with the check-fork.

I claim as my invention—

1. A clutch mechanism for corn-planters, comprising the shaft, the clutch member mounted on said shaft and arranged for continuous revolution, the disk keyed to said shaft and arranged for movement rectilinearly thereof, the locking-wheel normally engaging and retaining said disk against rotation, check-wire-operated rock-shaft and lever connections on said rock-shaft for moving the disk away from the locking-wheel and into operative engagement with the clutch member.

2. A clutch mechanism for corn-planters, comprising the shaft, the clutch member mounted on said shaft, driving connections between said clutch member and the traction mechanism of a corn-planter, a disk mounted for rectilinear movement on the shaft and arranged for rotation therewith, pins on said disk arranged for engagement at times with the clutch member, a spring between said disk and clutch member, a locking-wheel normally in locking engagement with said disk, an arm mounted for oscillation, a rock-shaft arranged for oscillation by a tappet on a check-wire, a pitman connecting said rock-shaft and arm and a spring acting to withdraw the arm from the disk upon the release of the rock-shaft from the tappet.

3. A clutch mechanism for corn-planters, comprising the shaft, the clutch member on said shaft, a disk on said shaft, a locking-wheel normally engaging and locking said disk, lever mechanism adapted to release the disk from the locking engagement of the locking-wheel and move said disk into operative engagement with the clutch member, and a check-wire-operated rock-shaft engaging said lever mechanism.

4. In a clutch mechanism for corn-planters, the disk formed with teeth on its periphery, the locking-wheel at right angles to said disk and formed with teeth on its periphery engaging with the teeth on the disk, which locking-wheel is formed with a notch to receive one of the teeth of the disk, two of the teeth of the disk being fore-shortened, and a clutch member arranged for engagement at times by said disk.

5. In a clutch mechanism for corn-planters, the rock-shaft, the check-fork thereon arranged for engagement by successive tappets of a check-wire, a crank-arm on the rock-shaft, an operating-shaft, a clutch member on the operating-shaft and arranged for continuous revolution, the clutch member keyed to said shaft, the locking device acting normally on the second clutch member, the pivoted spring-held arm and the pitman between the crank-arm and the pivoted arm.

Signed by me at Des Moines, Iowa, this 4th day of March, 1902.

ROBERT S. KIRKPATRICK.

Witnesses:
S. C. SWEET,
F. R. FAGRAL.